United States Patent
Chan et al.

(10) Patent No.: US 11,506,317 B2
(45) Date of Patent: Nov. 22, 2022

(54) MOUNTING MECHANISM FOR THERMOSTATIC DEVICES

(71) Applicant: Computime Ltd., New Territories (HK)

(72) Inventors: Dick Kwai Chan, Hong Kong (CN); Ben Ren Tan, Shenzhen (CN)

(73) Assignee: Computime Ltd., New Territories (HK)

( * ) Notice: Subject to any disclaimer, the term of this patent is extended or adjusted under 35 U.S.C. 154(b) by 521 days.

(21) Appl. No.: 16/561,098

(22) Filed: Sep. 5, 2019

(65) Prior Publication Data
US 2021/0071794 A1    Mar. 11, 2021

(51) Int. Cl.
*F16L 37/23* (2006.01)
*F16K 51/00* (2006.01)
*F16L 21/08* (2006.01)

(52) U.S. Cl.
CPC ............. *F16L 37/23* (2013.01); *F16K 51/00* (2013.01); *F16L 21/08* (2013.01)

(58) Field of Classification Search
CPC . F16L 21/08; F16L 37/22; F16L 37/23; F16L 37/10; F16L 37/101; F16L 37/08
USPC ............................ 285/81, 276, 277, 314, 315
See application file for complete search history.

(56) References Cited

U.S. PATENT DOCUMENTS

| | | | |
|---|---|---|---|
| 3,083,042 A * | 3/1963 | Collar | F16L 37/101 285/349 |
| 4,576,359 A * | 3/1986 | Oetiker | F16L 37/101 285/317 |
| 5,056,560 A * | 10/1991 | DeMartelaere | F16L 37/23 137/614.04 |
| 8,690,198 B2 * | 4/2014 | Saber | H01R 13/6276 285/276 |

FOREIGN PATENT DOCUMENTS

| | | |
|---|---|---|
| EP | 0654723 A2 | 5/1995 |
| EP | 1388715 A1 | 2/2004 |
| GB | 2498573 A | 7/2013 |
| WO | 2010/105799 A1 | 9/2010 |

OTHER PUBLICATIONS

Mar. 18, 2021—(EP) Extended European Search Report—App. No. 20194731.4.

* cited by examiner

*Primary Examiner* — Aaron M Dunwoody
(74) *Attorney, Agent, or Firm* — Banner & Witcoff, Ltd.

(57) ABSTRACT

A mounting device facilitates connecting an Internet of Things (IoT) device, such as thermostatic radiator valve (TRV) and automatic temperature balanced actuator (ABA), to a hydronic heating/cooling system to control the temperature of a room by changing the flow of hot/cold water through radiator. The mounting devices includes a male section and a female section, which is attached to the IoT device. The mounting device may be installed in two stages. First, a male section is attached to a component of the hydronic heating/cooling system (for example, a valve or manifold) by threading the male section onto the component. Second, a female section, is positioned to male section and locked into place by rotating a rotary sleeve. The female section (with the IoT device) may be easily removed by rotating the rotary sleeve into an unlock position.

17 Claims, 5 Drawing Sheets

MOUNTING MECHANISM FOR THERMOSTATIC DEVICES

TECHNICAL FIELD

Aspects of the disclosure relate to a mounting mechanism for thermostatic devices such as a thermostatic radiator valve (TRV) and an automatic temperature balanced actuator (ABA).

BACKGROUND

Internet of Things (IoT) applications are growing rapidly, and the demands on IoT control devices are increasing as well. Consequently, facilitating the installation of IoT control devices is important.

BRIEF DESCRIPTION OF THE DRAWINGS

The present disclosure is illustrated by way of example and not limited in the accompanying figures in which like reference numerals indicate similar elements and in which.

SUMMARY OF INVENTION

Figure 1:
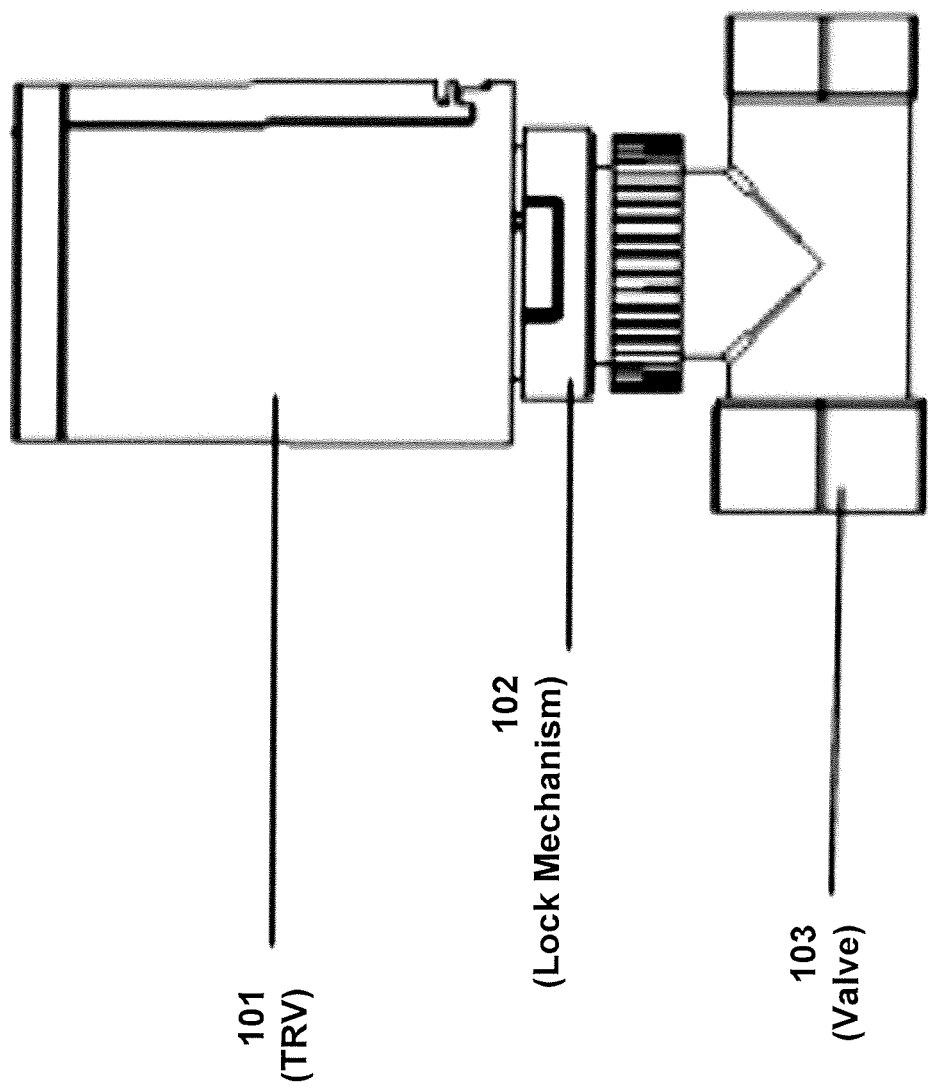
FIG. 1 shows a mounting mechanism for a thermostatic radiator valve (TRV) and a valve connection according to one or more aspects of the present disclosure.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In one embodiment, in accordance with aspects of the disclosure, a quick connect-disconnect coupling mechanism comprises a male section (portion) and a female section (portion).

With another aspect, a male section comprises a single adaptor having a lower end with threads and an upper end with a flange. The adapter may be constructed from a polymer and/or metallic materials.

With another aspect, a male section may have threads with a different size and different type to engage the threading of a valve or manifold of a hydronic heating system.

With another aspect, a male section may have a flange that is designed to engage spherical objects (balls) of corresponding female section.

With another aspect, a female section comprises a main body; a rotary sleeve, and one or more balls (spherical objects). Components of the female section may be constructed from a polymer and/or metallic materials.

With another aspect, a female section may include a main body that can mount to a valve controller by using screws, glue, or welding.

With another aspect, a female section may include main body that can be embedded to a body of a valve controller.

With another aspect, a female section may have a rotary sleeve that is movable relative to the main body and that stops spherical objects (balls) from moving in a release state.

With another aspect, a female section may have one or more than one spherical objects (balls) that engages a flange of a corresponding male section.

With another aspect, a mounting device facilitates connecting an Internet of Things (IoT) device such as thermostatic radiator valve (TRV) and automatic temperature balanced actuator (ABA) to a hydronic heating system to control the temperature of a room by changing the flow of hot water through radiator. The mounting devices includes a male section and a female section, which is attached to the IoT device. The mounting device may be installed in two stages. First, a male section is attached to a component of the hydronic heating system (for example, a valve or manifold) by threading the male section onto the component. Second, a female section, is positioned to male section and locked into place by rotating a rotary sleeve. The female section (with the IoT device) may be easily removed by rotating the rotary sleeve to an unlock position to retract it.

With another aspect, a mounting device facilitates connecting a IoT device such as thermostatic radiator valve (TRV) and automatic temperature balanced actuator (ABA) to a hydronic cooling system to control the temperature of a room by changing the flow of cold water through radiator.

With another aspect, a male section of a mounting device includes a flange and an indentation around the male section below and along the flange. The male section has a threaded lower end that is attached to a component of the hydronic heating system by threading the threaded lower end onto the component. The female section is inserted to the male section and attached to the male section by the locking mechanism, where one or more balls lock onto the indentation of the male section in a lock state when the rotary sleeve is in a lock position along a main body of the female section. The locking mechanism is released from the indentation of the male section when the rotary sleeve is in an unlock position along the main body.

With another aspect, a rotary sleeve of a female portion changes a space behind one or more balls as the rotary sleeve is rotated. When the rotary sleeve is rotated into a position that provides enough space behind the one or more balls, a flange moves the balls outward when the female portion is separated from a corresponding male portion of a mounting device.

With another aspect, a locking mechanism of a female section comprises one or more balls. The one or more balls locks into an indentation of a corresponding male section.

With another aspect, a thermostatic device is attached to an upper part of a female section. The thermostatic device may be embedded with, glued or welded to, or attached with one or more screws or latches to a bottom of the thermostatic device.

With another aspect, a mounting device may be implemented with a reverse design, where a female section is connected to a component of a hydronic heating system and a male section, which is attached to a IoT device, is locked to the female section.

These and additional aspects will be appreciated with the benefit of the disclosures discussed in further detail below.

DETAILED DESCRIPTION

FIG. 1 shows mounting mechanism 102 for coupling a thermostatic device such as thermostatic radiator valve (TRV) 101 to valve connection 103 in accordance with one or more aspects of the present disclosure.

With traditional approaches, installation of a valve controller (for example, a TRV or an automatic temperature balanced actuator (ABA)) to a hydronic heating/cooling system may be difficult and time consuming. With some traditional approaches, the valve controller is mounted to the hydronic heating/cooling system using a mounting ring, which may be constructed from metal or plastic. An installer must often use one hand to hold the controller body while aligning it to the valve or manifold and then to tighten the mounting ring with the other hand or with tools. The location of valves and manifolds may be very close to the wall or in areas that are difficult to be accessed by hand, thus making the installation very difficult, time consuming, and costly.

Figure 2:
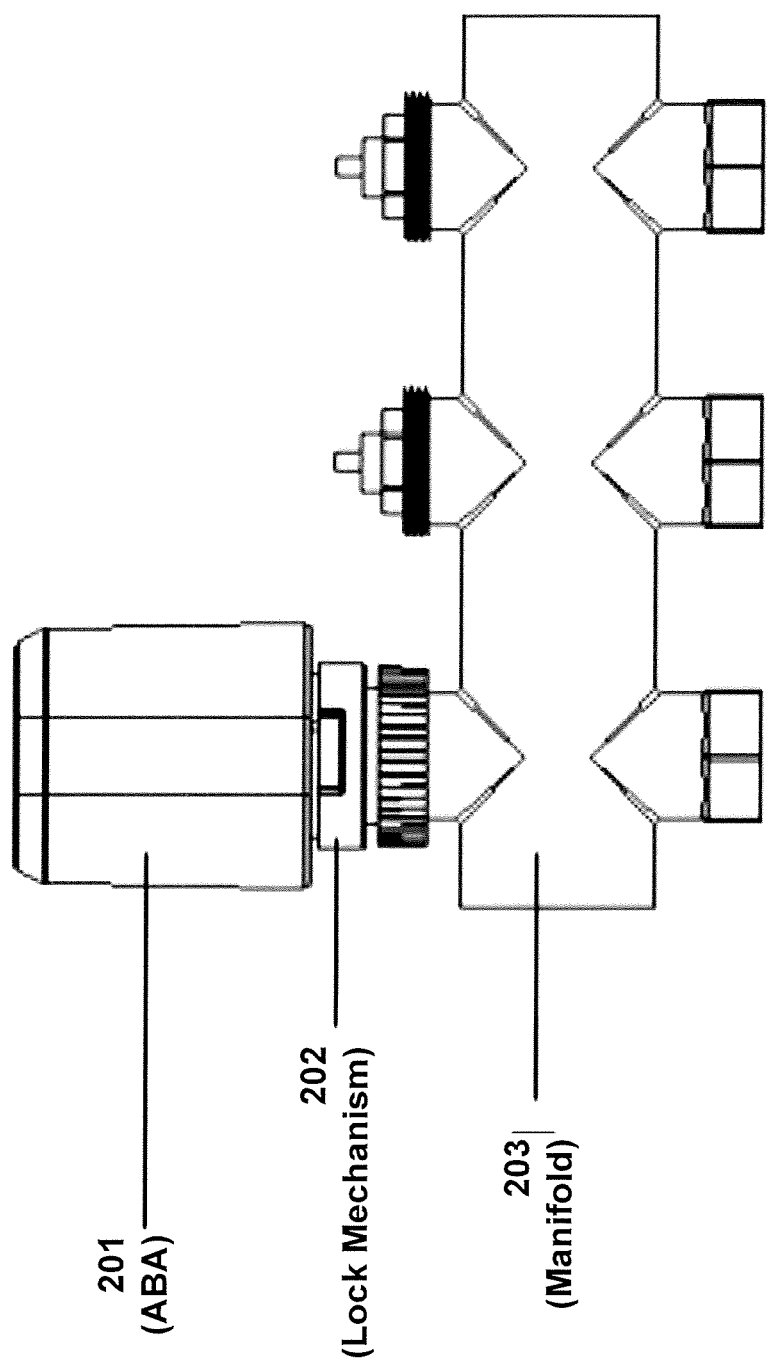
FIG. 2 shows a mounting mechanism for an automatic temperature balanced actuator (ABA) and a valve connection according to one or more aspects of the present disclosure.

Referring to FIGS. 1 and 2, mounting device 102 and mounting device 202 are adapted for connecting an Internet of Things (IoT) device such TRV 101 or ABA 201 to valve 103 or manifold 203, respectively, of a hydronic heating/cooling system. Devices 101 and 201 may control the temperature of a room by changing the flow of hot/cold water through a radiator.

Embodiments may support other types of IoT devices with a water flow sensor including a water flow controller, an in-line shutoff valve/actuator, an in-line metering valve/actuator, and so forth. For example, an IoT device can turn off a valve/manifold of a heating/cooling system when a pipe bursts.

IoT devices are often computing devices that connect wirelessly to a network and have the ability to transmit data. IoT devices utilize internet connectivity for remote monitoring and controlling.

With an aspect of the embodiments, mounting devices 102 and 202 enable IoT devices, such as TRV 101 and ABA 201, to be connected/disconnected securely and without tools to a hydronic heating/cooling system (for example, to/from valve 103 and manifold 203, respectively) in order to control the temperature of a room by changing the flow of hot/cold water through a radiator.

With an aspect of the embodiments, mounting devices 102 and 202 comprise connect and disconnect mounting mechanisms that allow IoT control devices (including TRV and ABA) to mount to a valve or manifold quickly, securely and tool-less.

With an aspect of the embodiments, a mounting mechanism comprises a male portion (section) and a female portion (section), where an IoT device may be attached to the female portion. Installation of the IoT device typically occurs in two stages. First, only the male portion is attached to a component of a hydronic heating/cooling system (for example, a valve or manifold) by threading it onto the component. Second, the female portion is attached to male portion using a lock mechanism as will be discussed.

A IoT device (not explicitly shown) may be attached to the female portion by latches, screws, gluing, welding, or embedding the female portion to the bottom of the IoT device.

With an aspect of the embodiments, a mounting mechanism comprises a female portion and a male portion, where an IoT device may be attached to the male portion. Installation of the IoT device occurs in two stages. First, only the female portion is attached to a component of a hydronic heating/cooling system (for example, a valve or manifold) by threading onto the component. Second, the male portion is attached to the female portion using a quick lock mechanism as will be discussed.

A IoT device (not explicitly shown) may be attached to male portion by latches, screws, gluing, welding, or embedding the male portion to the bottom of the IoT device.

Figure 3:
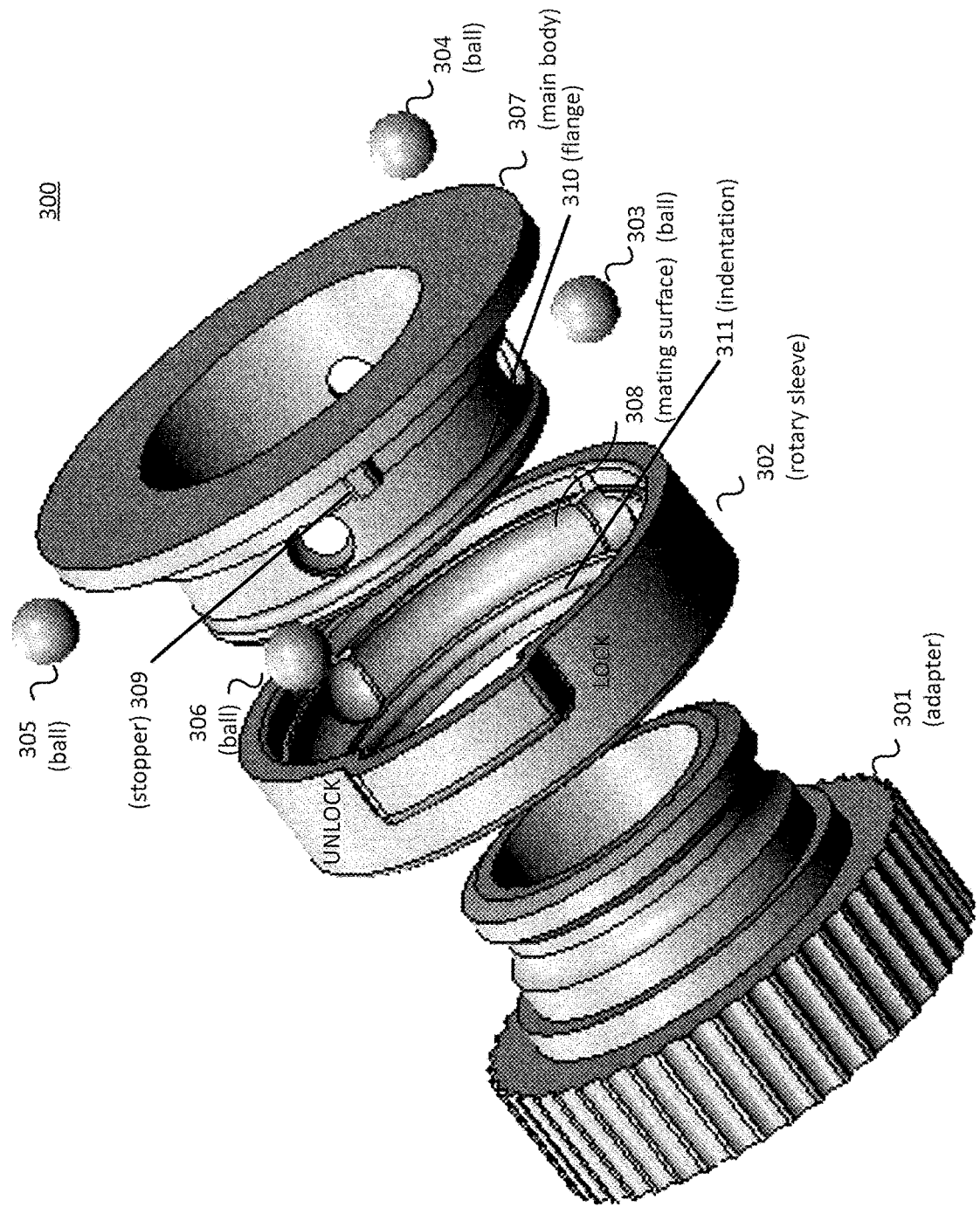
FIG. 3 shows a perspective view of a mounting mechanism according to one or more aspects of the present disclosure.

FIG. 3 mounting mechanism 300 that comprises a male section (comprising adapter 301) and female section (comprising rotary sleeve 302, spherical objects (balls) 303-306, and main body 307). Embodiments may support different numbers of balls, for example 1, 2, 3, 4, or more.

Indentation 311 of rotary sleeve 302 is coupled onto flange 310 of main body 307, where rotary sleeve 302 stays engaged with main body 307 and can rotate. However, stopper 309 of main body 307 limits rotary sleeve 302 to rotate between lock and unlock positons. Rotary sleeve 302 includes mating surface 308 that enables a distance behind balls 303-306 to change when rotary sleeve 302 is rotated between a lock position and an unlock position. As will be discussed, when rotary sleeve 302 is in the unlock position, there is sufficient space behind balls 303-306 so that balls 303-306 can move outward, allowing the female section to be removed from the male section.

As will be discussed, mounting mechanism 300 may be installed or uninstalled by an installer rotating rotary sleeve 302. With some hydronic cooling system configurations, it may be preferable for the installer to rotate mounting components rather than to linearly move the mounting components when the available space is limited when installing a thermostatic device.

Figure 4:
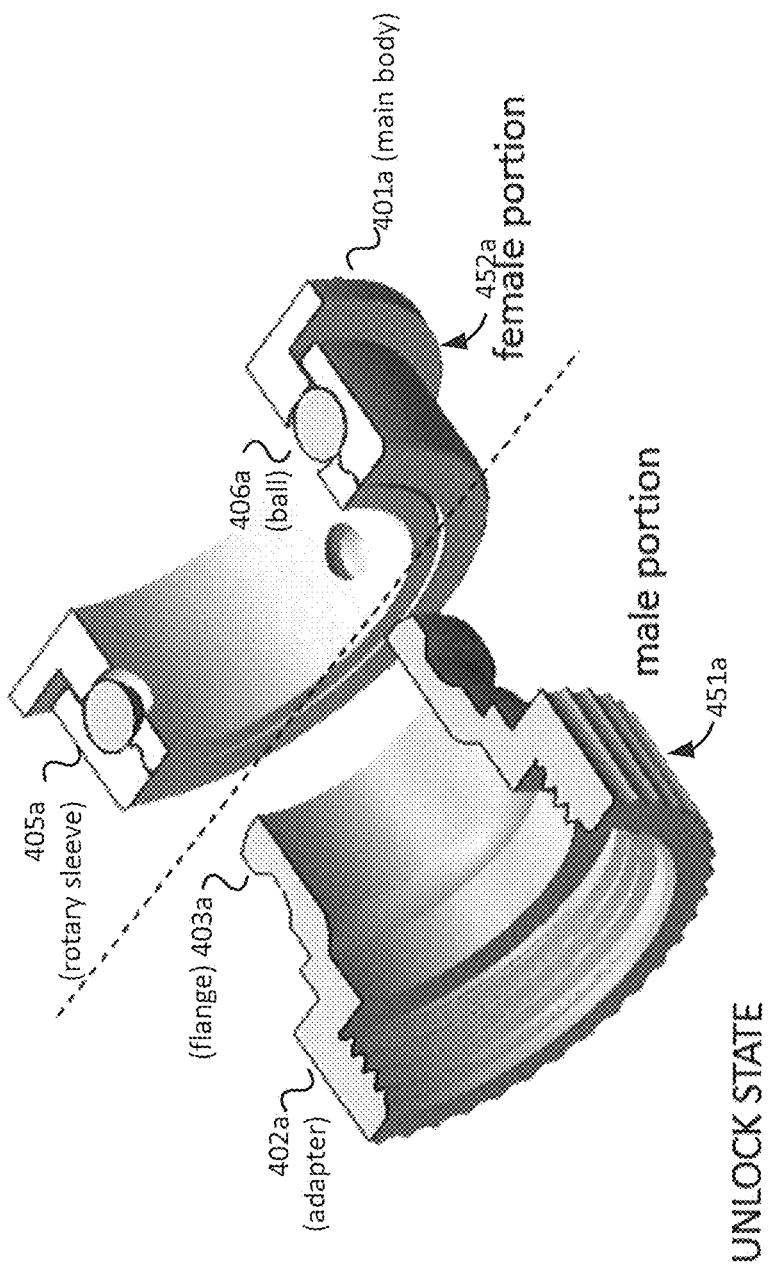
FIG. 4 shows a sectional view of a mounting mechanism in an unlocked state according to one or more aspects of the present disclosure.

FIG. 4 shows a sectional view of mounting mechanism 300 shown in FIG. 3 in an unlocked state.

As shown in FIG. 4, male portion 451a comprises single part adaptor 402a having a lower end with threads. The threads may be manufactured with different dimensions to fit different types of valve and manifold. Adaptor 402a is often small and can be easily grabbed by hand to mount quickly onto the valve or manifold by turning the threads. The upper end has flange 403a and indentation 404a, which allows quick coupling to female section 452a.

As shown in FIG. 4, female section 452a comprises main body 401a, rotary sleeve 405a, and one or more balls 406a. Main body 401a may be an assembly part separate from a valve controller body or may be embedded as a section of a valve controller housing.

When rotary sleeve 405a is rotated to an unlock (release) position, there is a space behind ball 406a. Ball 406a can then be pushed outward by flange 403a of adaptor 402a as an installer is removing female portion 452a from male portion 451a. Female portion 452a can then be separated from adapter 402a of male portion 451a when in the unlock state.

Figure 5:
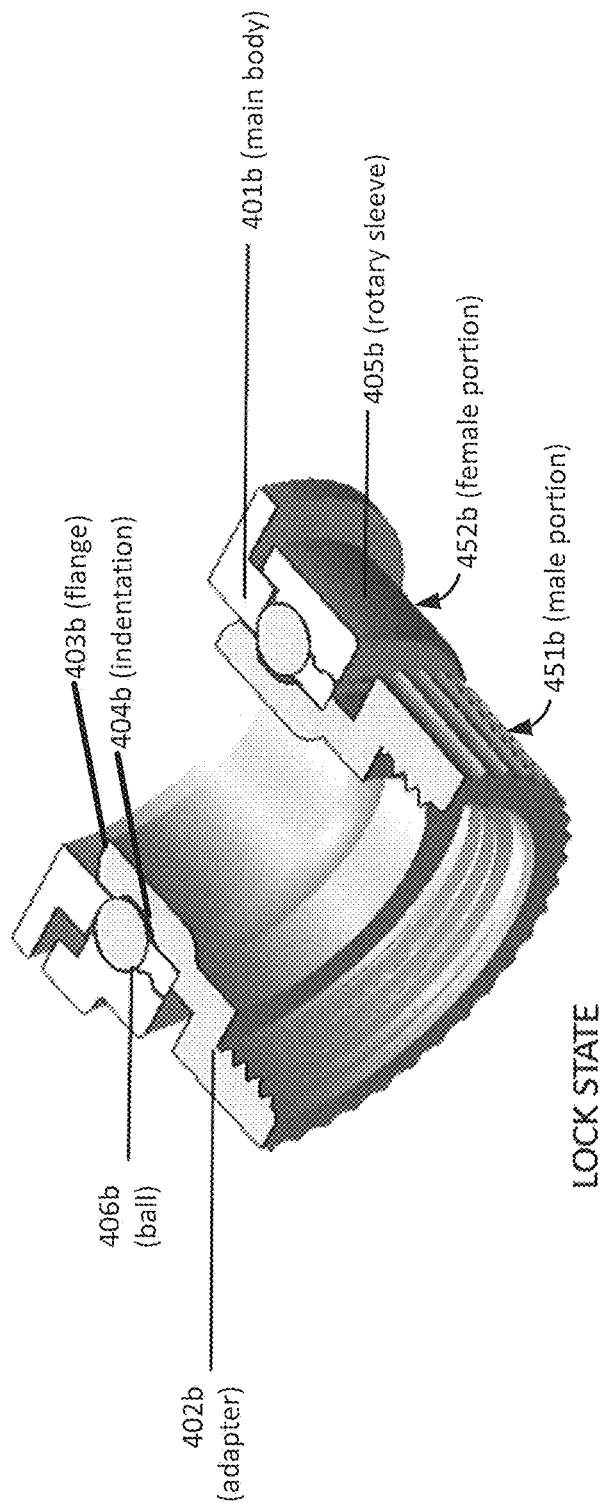
FIG. 5 shows a sectional view of a mounting mechanism in a locked state according to one or more aspects of the present disclosure.

FIG. 5 corresponds to FIG. 4 when the mounting mechanism shown in FIG. 3 in an lock state. Referring to FIG. 4, to engage female portion 452a to male portion 451a, an installer can rotate rotary sleeve 405a to an unlock state and insert female portion 452a to male portion 451a. Referring to FIG. 5, the installer then rotates rotary sleeve 405b to a lock state. When rotary sleeve 405b is in the lock state, ball 406b is positioned in indentation 404b. Because there is insufficient space behind ball 406b, ball 406b cannot move outward so that flange 403b of adaptor is locked by the ball 406b. Consequently, female portion 452b cannot be separated from adaptor 402b in the lock state.

Referring back to FIG. 4, to remove female portion 452a from male portion 451a, the installer rotates rotary sleeve 405a to the unlock position and pulls female portion 452a from male portion 451a. As previously discussed, when rotary sleeve 405a is rotated to the unlock position, there is a space behind ball 406a. Ball 406a can then be pushed outward by flange 403a.

The following embodiments describe innovative aspects that are directed to a mounting mechanism. For example, one aspect supports and adaptation for connecting an Internet of Things device such as a thermostatic radiator valve or an automatic temperature balanced actuator to a hot water heating system to control temperature of a room by changing the flow of hot water through radiator.

With a first embodiment, a quick connect-disconnect coupling mechanism comprises a male and a female portion.

With a second embodiment, a male portion of a mounting mechanism comprises a single part adaptor where a lower end has threads and an upper end has flange.

With a third embodiment, a female portion of a mounting mechanism includes a main body, a rotary sleeve, and a plurality of spherical objects (for example, balls).

With a fourth embodiment, a male portion of a mounting mechanism is formed with polymer and/or metallic materials.

With a fifth embodiment, a female portion of a mounting mechanism has a main body, rotary sleeve and balls constructed from polymer and/or metallic materials.

With a sixth embodiment, a male portion of a mounting mechanism has threads selected from different sizes and different types to properly engage a valve and manifold.

With a seventh embodiment, a male portion of a mounting mechanism has a flange is designed for engaging balls of a female portion.

With an eighth embodiment, a female portion of a mounting mechanism has a main body that can mount to a valve controller by using screws, glue, and/or welding. The female portion may also be embedded to a body of a valve controller.

With a ninth embodiment, a female portion of a mounting mechanism has a rotary sleeve that is movable relative to a main body. The rotary sleeve prevents balls from moving when the mounting mechanism is in a lock state.

With a tenth embodiment, a female portion of a mounting mechanism has one or more balls for engaging a flange of a male portion of the mounting mechanism.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. An apparatus for mounting a thermostatic device to a hydronic heating/cooling system, the apparatus comprising:
a male section comprising a first flange and a first indentation beside the first flange, the male section having a threaded lower end and the first flange located at an upper end, the male section configured to attach to a component of the hydronic heating/cooling system by threading the threaded lower end onto the component of the hydronic heating/cooling system; and
a female section comprising a main body, a rotary sleeve, and a locking mechanism, the female section configured to attach to the male section by the locking mechanism locking onto the first indentation of the male section in a lock state when the rotary sleeve is in a lock position along the main body, the locking mechanism releasing from the first indentation of the male section in a unlock state when the rotary sleeve is rotated to an unlock position along the main body, the female section configured to attach to the thermostatic device, wherein the locking mechanism comprises at least one spherical object, the at least one spherical object locking into the first indentation when in the locked state, wherein the rotary sleeve comprises a mating surface having a varying depth around an inner side of the rotary sleeve, wherein when rotated between the lock position and the unlock position, changes a distance behind the at least one spherical object with the varying depth, wherein when the rotary sleeve is rotated to an unlock position, the distance behind the at least one spherical object is sufficient for the at least one spherical object to move outward when the first flange pushes against the at least one spherical object allowing the female section to be removed from the male section, wherein the main body comprises a second flange and the rotary sleeve comprises a second indentation, and wherein the second flange mates with the second indentation to allow only rotational movement of the rotary sleeve without axial movement of the rotary sleeve in the axial direction.

2. The apparatus of claim 1, further comprising:
the thermostatic device, wherein the thermostatic device is attached to an upper part of the female section.

3. The apparatus of claim 2, wherein the female section is embedded with a bottom of the thermostatic device.

4. The apparatus of claim 2, wherein the female section is glued to a bottom of the thermostatic device.

5. The apparatus of claim 2, wherein the female section is welded to a bottom of the thermostatic device.

6. The apparatus of claim 2, wherein the female section is attached to a bottom of the thermostatic device by at least one screw.

7. The apparatus of claim 2, wherein the female section is attached to a bottom of the thermostatic device by at least one latch.

8. The apparatus of claim 1, wherein the main body has a stopper to maintain the rotary sleeve in the lock position.

9. The apparatus of claim 1, wherein the threaded lower end has threads of a size and a type to match the component of the hydronic heating/cooling system.

10. The apparatus of claim 1, wherein the thermostatic device comprises a thermostatic radiator valve (TRV) assembly.

11. The apparatus of claim 1, wherein the thermostatic device comprises an automatic temperature balanced actuator (ABA) assembly.

12. The apparatus of claim 1, wherein at least one of the female section and the male section is constructed from a polymer.

13. The apparatus of claim 1, wherein at least one of the female section and the male section is constructed from a metallic material.

14. A mounting device for mounting a thermostatic device to a hydronic heating/cooling system, the mounting device comprising:
a male section comprising a first flange and a first indentation beside the first flange, the male section having the first flange located at a lower end, the male section configured to attach to the thermostatic device; and a female section comprising a main body, a rotary sleeve, a locking mechanism, and a threaded end, the female section configured to attach to a component of the hydronic heating/cooling system by threading the threaded end onto the component of the hydronic heating/cooling system, the female section configured to attach to the male section by the locking mechanism locking onto the first indentation of the male section in a lock state when the rotary sleeve is rotated to a lock position, the locking mechanism releasing from the first indentation of the male section in an unlock state when the rotary sleeve is rotated to an unlock position along the main body, wherein the locking mechanism comprises at least one spherical object, the at least one spherical object locking into the first indentation when in the locked state, wherein the rotary sleeve comprises a mating surface having a varying depth around an inner side of the rotary sleeve, wherein when rotated between the lock position and the unlock position, changes a distance behind the at least one spherical object with the varying depth, wherein when the rotary sleeve is rotated to an unlock position, the distance behind the at least one spherical object is sufficient for the at least one spherical object to move outward when the flange pushes against the at least one spherical object allowing the female section to be removed from the male section, wherein the main body comprises a second flange and the rotary sleeve comprises a second indentation, and wherein the second flange mates with the second indentation to allow only rotational movement of the rotary sleeve without axial movement of the rotary sleeve in the axial direction.

15. The mounting device of claim 14, wherein the female section further comprises a stopper that maintains the rotary sleeve in a lock state when the rotary sleeve is rotated into the lock state.

16. The mounting device of claim 14, wherein the male section is embedded with a bottom of the thermostatic device.

17. An Internet of Things (IoT) component mountable in a hydronic heating/cooling system, the IoT component comprising:

a IoT device;

a male section comprising a first flange and a first indentation beside the first flange, the male section having a threaded lower end and the first flange located at an upper end, the male section configured to attach to a system component of the hydronic heating/cooling system by threading the threaded lower end onto the system component of the hydronic heating/cooling system; and a female section attached to the IoT device, the female section comprising a main body, a rotary sleeve, a plurality of spherical objects, a locking mechanism, and a stopper, the female section configured to attach to the male section by the plurality of spherical objects locking onto the first indentation of the male section in a lock state when the rotary sleeve is in a lock position along the main body, the plurality of spherical objects releasing from the first indentation of the male section in a release state when the rotary sleeve is in an unlock position along the main body, the stopper maintaining the lock state by preventing the rotary sleeve from rotating without a rotational force provided by an installer, wherein the locking mechanism comprises at least one spherical object, the at least one spherical object locking into the first indentation when in the locked state, wherein the rotary sleeve comprises a mating surface having a varying depth around an inner side of the rotary sleeve, wherein when rotated between the lock position and the unlock position, changes a distance behind the at least one spherical object with the varying depth, wherein when the rotary sleeve is rotated to an unlock position, the distance behind the at least one spherical object is sufficient for the at least one spherical object to move outward when the flange pushes against the at least one spherical object allowing the female section to be removed from the male section, wherein the main body comprises a second flange and the rotary sleeve comprises a second indentation, and wherein the second flange mates with the second indentation to allow only rotational movement of the rotary sleeve without axial movement of the rotary sleeve in the axial direction.

* * * * *